Patented Feb. 25, 1941

2,232,977

UNITED STATES PATENT OFFICE 2,232,977

METHOD OF PRODUCING INTEGRAL WATERPROOFING EMULSIONS AND PRODUCTS THEREOF

Charles H. Schuh, Brooklyn, N. Y., assignor to Bakelite Building Products Co., Inc., New York, N. Y., a corporation of Delaware No Drawing. Application April 9, 1938, Serial No. 201,082

16 Claims. (Cl. 134—15)

The present invention relates to waterproofing emulsions and to methods of producing highly effective integral waterproofing emulsions.

As those skilled in the art know, the water absorption of various products may be reduced by the addition of suitable water-repellent materials which are distributed throughout the body of such products. Thus, rosin was extensively used in the preparation of paper, as were other resins and waxes. Calcium soaps were used to a great extent in attempted waterproofing of cement and concrete. Asphalts were used in felt and paper bases for roofing, in concrete and for the purpose of road building.

These conventional water-repellent agents were generally mixed as uniformly as possible with the composition during the manufacture of the various products. Clearly, it was difficult or even impossible to obtain uniform distribution of these water-repellent agents in an aqueous medium. More recently, these agents were frequently used in the form of emulsions which made it possible to obtain a much better distribution with a greater ease. The trend of development was to employ finer and finer suspensions of the agent in the emulsion and consequently also in the finished product in which the emulsion was incorporated. More particularly, those skilled in the art were firmly convinced that emulsions of water-repellent agents which are to be incorporated into various compounds, should be very finely dispersed and well stabilized to preserve the fine dispersion, readily mixable with water in all proportions and possessive of such a character as not to be "broken" down easily by electrolytes. In other words, an emulsion was desired that to all intents was stable both before and after dilution and that required the addition of a strong electrolyte (not tap water) to cause breaking. For example, in U. S. Patent No. 1,913,430, which is concerned with an emulsion of oil with the addition of a naphthenic soap of a polyvalent metal, proposed as an integral waterproofing agent in concrete and similar products, it is clearly stated that in order to be satisfactory for the purpose contemplated, the emulsion must be miscible with water in all proportions without "breaking" down. In other words, the emulsion had to be finely dispersed and well stabilized.

Although these prior waterproofing emulsions were satisfactory to a certain limited extent for various specific uses, their usefulness has been frequently questioned by the experts, and was held to be highly problematic even in the case of ordinary cement and concrete products which normally have about 10% to 18% of voids. I have found them to be altogether unsuitable where the product has any degree of porosity and a substantial degree of water imperviousness is desired. Thus conventional emulsions completely failed as integral waterproofing agents in cellular compositions having a substantial percentage of voids, for example, they failed with the cement-fiber products of my copending application Serial No. 60,447, filed January 23, 1936, which generally have 40% and more finely distributed voids. The high percentage of voids probably explains why the effectiveness of conventional waterproofing agents in such products is practically insignificant even where such agents are employed in substantial quantities. Although various suggestions and proposals were made to solve the outstanding problem, none, as far as I am aware, was completely satisfactory and successful on a practical and industrial scale.

I have discovered that the problem may be solved in a remarkably simple manner.

It is an object of the present invention to provide a method for producing a highly effective integral waterproofing emulsion of novel and improved character which is free from the disadvantages of prior waterproofing emulsions.

It is an object of my invention to form as by high speed mixing, an oil-in-water emulsion comprising water-repellent materials, solid or semi-solid at normal atmospheric temperature and a weak dispersing agent, preferably soap, the individual particles of which emulsion are normally characterized by non-adherent properties, but which upon dilution are transformed to particle groups exhibiting adherent qualities and without reversing the emulsion.

It is another object of my invention to provide an aqueous emulsion of water-repellent material that is stable in normal handling but that undergoes a transformation upon aqueous dilution without the aid of a strong electrolyte.

A further object of my invention is the preparation of an emulsion of water-repellent material, in which the average particle size of the majority of individual particles of the water-repellent material is preferably of the order of 5 microns (0.005 mm.), with a minimum of 3 microns and preferably a maximum of 10 microns.

A further object is the provision of primary emulsions having a dispersed phase of solid or semi-solid water-repellent substances that upon dilution will transform into secondary emulsions comprising a voluminous flocculent aqueous mass of minute flocks of particles of the water-repellent substance which are free from any tendency to agglomerate and that may subsequently be diluted and mixed to any extent without destroying the flock characteristic.

Another object of the invention is to form an aqueous emulsion of high melting point water-repellent materials using a solvent as an aid in emulsification in such amounts, however, as not to prevent the formation of a dispersed phase of substantially solid particles following emulsification.

Another object is the provision of a highly effective integral waterproofing emulsion adapted to markedly improve the water-resistance of cellular products without substantially decreasing the percentage of unfilled voids.

Another object is to form an emulsion in concentrated form sufficiently stable to permit handling and storage, which does not include any stabilizing or peptizing agents.

It is another object of the present invention to provide a method for producing a highly effective integral waterproofing emulsion which is especially adaptable for reducing the moisture absorption of cement and cement-fiber compositions.

It is a further object of the invention to provide a novel and improved method of producing paraffin emulsions, particularly for the purpose of waterproofing agents within cement-fiber products, and which provides excellent waterproofing results with relatively small amounts of emulsion, i. e. out of all proportion to the amount of emulsion used.

Still another object is the provision of a highly effective integral waterproofing emulsion for products made of a finely divided aggregate and a binder.

Another object is the provision of an emulsion of the oil-in-water type having a pH value of about 7 to about 8.5, which upon dilution with tap water transforms near the neutral point into a secondary emulsion of the same type but having altered characteristics.

A further object of my invention is the formation of an emulsion of relatively unstable character sufficiently stable to be handled and stored without breaking down and that transforms into a secondary emulsion upon dilution, having altered but stable characteristics.

A specific object of my invention is to provide an emulsion of the oil-in-water type, in which the dispersed phase consists of small individually mobile groups of solid or semi-solid particles of the substance constituting said phase, which groups exhibit adherent tendencies when brought into contact with materials to be made moisture resistant and which are not readily lost in filtration processes.

Another object is the provision of a concentrated secondary emulsion formed by diluting a primary emulsion having a dispersed phase comprising solid or semi-solid particles to cause transformation to the secondary form and subsequently removing the excess portion of the continuous phase.

An additional object is the provision of an unstable aqueous emulsion that transforms upon dilution at a pH of about 6.8 (tap water) into a secondary emulsion having different characteristics.

It is also within the contemplation of the invention to provide an unstable paraffin emulsion of novel character which can be advantageously used as a water-proofing agent in cement-fiber compositions having a large percentage of microscopic voids therein.

The invention also contemplates a process for the production of a novel and improved waterproofing emulsion particularly adapted to be used as a water-proofing agent in cement-fiber compositions having a large percentage of microscopic voids therein and which may be manufactured on a practical and industrial scale at a low price.

Other and further objects and advantages of the invention will become apparent from the following description taken in conjunction with the following illustrative examples.

Broadly stated, according to my invention, I provide principles which are a complete departure from the conventional principles employed in prior water-proofing emulsions. Prior emulsions were generally of the oil-in-water type; invariably included stabilizing and peptizing agents; had the greatest possible stability at all dilutions and had the smallest obtainable particle size, usually about $\frac{1}{10}$ of a micron and hardly ever over 2 microns. The reason that oil-in-water emulsions were used was their ready miscibility with water in all proportions, whereas this is not the case with water-in-oil emulsions. Moreover, it was expected that by having good stability and small particle size, the emulsion would not be subject to breaking down in the ordinary process of handling, shipping and mixing in use, and particularly the small particle size permitted fine distribution of the waterproofing agents in the finished product.

I have now discovered, however, that when such stable emulsions are used, for example, in cement-fiber or other compositions which are filtered in forming matrices thereof, there is considerable loss of the water-repellant agent during the filtering and dewatering operations due to the fineness of the particles and due to the facility with which the particles are carried away by the water. Also, a prior oil-in-water emulsion does not readily adhere to a surface with which it comes in contact as compared to a water-in-oil emulsion, the adherence of which is generally very good. Moreover, the quantity of the water-proofing agent which is actually retained and is distributed in the voids of the finished product is very ineffective, probably because of the smallness of the mobile emulsion particle in comparison to the size of the voids. The size of the voids in certain products is often about 50 to 150 microns, whereas the average size of the conventional emulsion particles is generally not over 2 microns and more usually $\frac{1}{10}$ of a micron. This situation is further aggravated by the fact that the mobile particle of the prior oil-in-water emulsion offers no resistance to the flow of water around it. In other words, in emulsification it has lost its water-repellent property as an individual particle. The particle may be washed about readily in dilution, or if held in place in the finished product, it will not resist the flow of water by its surface. Thus, the water will readily force its way into the voids of the finished product by capillary action in spite of the presence of such particles in and on the walls of the voids.

Accordingly, it is the basic concept of my invention to provide a primary concentrated emulsion comprising a dispersed phase of mobile individual solid or semi-solid, i. e. substantially solid, particles having substantially non-adherent qualities and having relatively larger average size, which dispersed phase is transformable without reversion upon dilution into a secondary emulsion of mobile individual groups of associated individual particles which retain their water-repellent properties and which grouped particles exhibit a tendency of strongly adhering to surfaces with which they come in contact. Also I provide, where desired, a concentrated secondary emulsion of this type by removal of the excess water from the dilute emulsion as formed. I have found that to satisfy these considerations, the preferred emulsion is preferably a readily transformable one adapted to handling and storage without breaking and contains a major portion of particles of large average size in excess of one micron, preferably about 5 and under 25 microns, and although normally comprising mobile individual particles of the dispersed phase of an oil-in-water type emulsion in concentrated form, to be of such character as to be transformed into what is believed to be a similar type emulsion differing in that it is completely stable under all dilutions and consists of mobile individual groups of associated individual particles. Preferably, the emulsion comprises a dispersed phase of water-repellent material having a relatively high melting point so that it will be in solid or semi-solid state at the temperatures at which it is employed.

The emulsion has to be of such a stability that it will transform by mere dilution to the final condition in which it may be used in making the composition in question to be waterproofed and will not require "breaking" with or without the use of strong electrolytes, which is necessary to precipitate the dispersed phase of a stable emulsion as typified by the prior art. With the transformed emulsions of my invention, adherence is an inherent property of the dispersed phase and no precipitation is necessary. The transformation from the primary to the secondary condition is gradual and not sharp. Also, the primary emulsions of my invention provide at the transformation point particles of flocculent character which form into individual groups of small numbers of contacting particles and which remain so constituted, irrespective of further dilution. In general, each group comprises about 10 or more particles. The number will depend upon the water-repellent substance and the size of the individual particles forming the emulsion.

I do not know exactly the cause of the transformation from the primary to the secondary emulsion but I believe that the initially weak films of dispersing agent surrounding the individual particles of the dispersed phase are further weakened by dilution. This may cause the particles to be influenced by electrical charges believed to be set up in the initial emulsification. The result of the presence of these electrical charges may be the attraction at vulnerable points of the particles carrying opposite charges, and the arrangement of the individual particles into associated groups not adhering to each other and having sufficient stability to resist breakdown. Moreover, it is believed that the electrical charges account somewhat for the stability of the primary emulsion.

While a variety of water-repellent substances may be used in preparing the emulsions of my invention, I have found that paraffin has many advantages and from the angle of its processing, use and effectiveness in water-proofing, it is the preferred substance. Paraffin has a relatively high melting point. Paraffin also has a low degree of adhesion and I have found that it forms readily transformable primary emulsions of the invention in dilute soap solutions having a pH value near the neutral point and under proper conditions can be processed to the proper degree of stability. When diluted, the paraffin primary emulsions of the present invention transform gradually under proper conditions into the secondary emulsions of the invention. Moreover, paraffin can be readily processed in accordance with the principles of the present invention without the use of any additional chemical agents, is very economical to use, and has excellent water-repellent properties.

To obtain the preferred dispersion of paraffin, I prefer to use a commercial dispersing agent. I have found that a small amount, less than about 10% of the weight of the paraffin, of soluble soap stock of the sodium or potassium fatty acid type, for instance, rosin laundry soap stock or commercial liquid potassium stearate soaps, or the like, are effective. I prefer to use a 2% aqueous solution. Other dispersing agents such as linoleates or caseinates, while not as desirable by reason of cost, etc., may be employed. Moreover, the dispersing agents may be combined. I employ the paraffin in the liquid, preferably molten state, and either pour it into the hot or substantially boiling soap solution, or preferably heat the paraffin together with the soap solution until the paraffin has completely melted. Obviously, if desired, the soap might be added at any other step during the preparation of the liquid paraffin. This is not as satisfactory as the foregoing methods.

The pH of the paraffin solution should preferably be in the proximity of 7 to 8.5, but not under 6.5. I have found that under such conditions, it is rather difficult to emulsify the paraffin and that ordinarily it would not be expected to obtain substantially complete emulsification. However, if the degree of agitation under which the emulsion is produced, is controlled with proper accuracy, the difficulty is overcome. Thus, if the agitation is not vigorous enough, and the paraffin is not subjected to sufficient shearing action, no complete emulsification will be obtained and more or less of the paraffin will collect in comparatively large particles or even in lumps at the surface of the mixture. On the other hand, if the agitation is too vigorous, the emulsified paraffin tends to coalesce during the process and forms similar lumps collecting at the surface. Also, under certain conditions, as when a considerable amount of air is drawn into the body of the mixture, a very fine particle size is obtained, which, of course, is not preferred for the purposes of the present invention.

I have found that a 5 gallon mixer having a ½" flat propeller blade set almost straight, or preferably a ½" circular blade with a corrugated facing and also set straight, produces considerable shearing action at about 3,500 R. P. M. with a minimum of agitation in the body of the liquid, and provides proper particle sizes and very satisfactory results. After complete emulsification has taken place, the time required is dependent upon the volume of material being operated upon, the mixing is interrupted and the emulsion is allowed to cool. When cold, the concentrated part of the paraffin emulsion usually settles toward the top in a foamy cream layer and comprises individual particles in the solid or semi-solid state. For this reason the mixture is then slowly stirred to a uniform consistency in the nature of a cream or paste, in which condition it remains. The amount of soap solution is preferably between 80% to 150% of the weight of the paraffin, with an optimum of 100%. The amount may be further increased if desired, but such is unnecessary.

Generally, the average particle size will determine the amount of dispersing agent essential for the primary emulsion. In the preferred range (5–25 microns), about a 2% solution will be found satisfactory in most cases. If the average particle size of the majority of particles is less than 1 micron more in the order of 1/10 microns, I have found that a primary emulsion may be made only if a very small amount of dispersing agent, for instance, 1/2% solution, is used. However, a primary emulsion of this character, in order to be transformed into the secondary emulsion type, must be diluted to a point where any waterproofing results therefrom would be far less than that obtained where the particle size is the preferred one. On the other hand, if the average particle size of the majority of particles is in the order of 30–50 microns, a greater amount of dispersing agent is required to prepare the primary emulsion. I have discovered that such particles transform into the secondary emulsion at a higher pH value than a primary emulsion of the preferred particle size and have found that in certain cases the amount of dilution is not sufficient for good results. Even if it were, a non-uniform particle size is existent as it is almost impossible to obtain large particles without the presence of a great deal of small particles and such invariably causes excessively large flocks to be formed that are detrimental to the distribution in a mass of material to be waterproofed. Also, an excess of soap dispersing agent should be generally avoided as it may affect the waterproofing properties of the emulsion and may be detrimental with certain compositions to which the emulsion is added. Accordingly, where best waterproofing results are desired, the preferred particle sizes should be obtained.

For the purpose of giving those skilled in the art a better understanding of the invention, the following illustrative example is given.

Example No. 1

About 0.2 pounds of commercial sodium stearate soap is dissolved in about 10 pounds of water. 10 pounds of ordinary paraffin wax having a melting point of 128° F. is added to the solution, which is heated until all of the wax is melted. The mixture is now subjected to the action of a high speed mixer of the type described hereinabove until it is completely emulsified to a foamy cream. This will require about 3 to 4 minutes. Thereafter, the mixture is allowed to stand for several hours in order to cool and permit reformation of the particles of paraffin into the solid or semi-solid state, and is then stirred slowly and mixed to a uniform cream or paste. About 5 gallons of primary emulsion will be obtained.

The primary emulsion prepared in this manner possesses all of the desirable characteristics referred to hereinbefore. It is sufficiently stable in concentrated form to be handled and may be stored without deterioration for any length of time. The emulsion may be diluted to a considerable degree before showing any signs of transforming into the secondary emulsion. In use, it may be mixed with a dilute composition to be waterproofed in concentrated form or may first be diluted to the "secondary" condition, and then added. If diluted below about 5% paraffin content, the primary emulsion will transform into the secondary emulsion. The flocks found are small, about 1/16 inch in diameter, and a microscopical examination will show them to be small aggregates of individual particles of the paraffin, each still having the same size as the individual particles of the dispersed paraffin in the primary emulsion, that is, about 5 to 25 microns. When allowed to collect at the surface, the plurality of flocks is readily broken up and the individual flocks are dispersed throughout the water by a slight shaking. In contrast to the individual dispersed paraffin particles of the primary emulsion, these flocks adhere to surfaces with which they come in contact and are capable of sticking even to glassy surfaces. This phenomenon is much similar to the well known behavior of water-in-oil emulsions, and since these small groups of particles engulf and carry with them minute particles of water, individually they may be considered as a water-in-oil emulsion member of an oil-in-water emulsion. It is of great importance that the primary emulsion prepared in accordance with the present invention will form small flocks when highly diluted, and that these flocks will not agglomerate into large masses.

It will be noted that as a result of the above characteristics, the primary emulsion embodying the features of my invention is convenient to handle, can easily be diluted to the point at which the flocculent paraffin is formed, and in this flocculent condition will, for example, effectively coat the fibers in a dilute pulp mixture for cement-fiber compositions. As the particles are of proper size and the flocks do not agglomerate, the emulsion will be practically completely retained by the cement-fiber mix during filtration and dewatering, and will be uniformly distributed, and due to the large particle size and retention of its excellent water-repellent qualities will lower to a remarkable degree the water absorption in the finished product in which it is used.

From the foregoing considerations, it will be readily understood that various other water-repellent solids or semi-solids having a melting point above the atmospheric temperature at which they are used, as waxes, ester gums, and/or natural and synthetic resin materials, of which Chinese wax, carnauba wax, rosin, Halowax (chlorinated naphthalene), shellac, or beeswax, are examples, may be used in the place of paraffin with substantial waterproofing results. Bituminous materials, such as asphalt, having a sufficiently high melting point, may also be employed. Solvents, for example, turpentine, toluol, benzine, alcohol, petroleum or oil, may be used where it is desired or essential to obtain lower viscosities and/or melting points. However, these solvents should be used in amounts as small as possible so that at least the major portion thereof will be evaporated or otherwise removed from the mixture prior to transforming the primary emulsion into the secondary emulsion, it being essential that the particles of the primary emulsion be in a solid or semi-solid state at that time. Where high temperature materials are used, the processing may also be conducted under pressure conditions to avoid excessive ebullition.

In all cases, it is preferred to use a relatively weak dispersing agent, such as a soap solution, generally having a concentration of about 2%. The concentration of the solution is, however, to be adjusted to the type of water-repellent material used, higher concentrations being employed for materials which are difficult to disperse. Of course, the combination of dispersing factors, including the type and concentration of the dispersing agent, the pH value of the solution, the dispersing temperature, the degree and the nature of the dispersing agitation, etc., has to be determined for each given case so that a primary emulsion of the desired characteristics is obtained.

The following additional examples will give some idea as to the procedure to be employed with substances other than paraffin.

*Example No. 2*

About 10 lbs. of ordinary commercial rosin having a melting point of about 110° C. are melted and about 0.5 lbs. of turpentine are added. This addition has the object of lowering the viscosity and the melting point in order to avoid pressure operations. About 0.6 lbs. of a potassium stearate soap are then dissolved in about 10 lbs. of boiling water. The melted rosin is then gradually run into the soap solution while the mixture is being subjected to the action of a high speed mixer, as described in Example No. 1. There is a strong tendency in this type of mixture to form a water-in-oil emulsion, when the concentration of soap is too low because of the moderate emulsifying shearing action that is being employed. For this reason, as will be noted, a considerable amount of soap is used. The proper mixture will be recognized by a considerable tendency to foam and the finished primary emulsion will be a very foamy product.

The finished primary emulsion in this case is very foamy but there is a greater variation in the particle size than in that of Example No. 1; that is this emulsion will generally contain a number of particles considerably above the average size. This is probably due to the difficulty with which the material is sheared apart, and in trying to obtain a particle of preferred size, some oversized particles seem to be unavoidable. However, this emulsion acts similar to the paraffin in that it transforms into the secondary emulsion upon dilution or upon mixing with the dilute composition, which it is intended to waterproof. The secondary emulsion of this material has greater adhering tendency than the secondary paraffin emulsion and therefore has a slight tendency to congeal into small masses when brought together. For this reason, it is preferred to mix this primary emulsion right in with the composition to be waterproofed while diluting, when it is being used.

*Example No. 3*

About 10 lbs. of chlorinated naphthalene sold under the trade-mark "Halowax" having a melting point of about 170° F. are melted and poured into 10 lbs. of hot soap solution containing about 0.8 lbs. of sodium stearate. The mixture is subjected to an emulsifying action as described in Example No. 1. The finished emulsion in this case is very similar to the paraffin emulsion of Example No. 1, but there is in this case a tendency to form a considerable number of small particles just as there was a tendency to form some large particles with the rosin of Example No. 2. The variation from the average is generally not so great here as with the rosin. The general characteristics, however, are similar in all these cases. This primary "Halowax" emulsion starts to transform into the secondary emulsion when diluted to below about 15% "Halowax" content. In this case the secondary emulsion particles also have a greater adhering tendency than is the case with the secondary paraffin emulsion of Example No. 1. I have found the secondary emulsion of "Halowax" to be quite effective but not as good as the paraffin for reducing moisture absorption in a composition with which it is integrally mixed.

*Example No. 4*

About 10 lbs. of Chinese wax are substituted for the "Halowax" in Example No. 3 and the emulsion is prepared in the same way. The finished product will be found to be very similar to the primary paraffin emulsion of Example No. 1. In this case, the secondary emulsion will adhere to surfaces as will the paraffin, but there is not as much sticking tendency as with the rosin or the "Halowax" of Examples Nos. 2 and 3, respectively.

*Example No. 5*

About 5 lbs. of Egyptian asphalt and 5 lbs. of paraffin are melted together and this mixture is substituted for the paraffin in Example No. 1. The primary emulsion is prepared in the same way. The finished primary product is similar to the primary paraffin emulsion of Example No. 1 in stability and general behavior on dilution. It is not as effective in the secondary state for reducing moisture absorption as is the secondary emulsion in which paraffin is used alone.

It is to be noted that the process of the present invention provides important advantages. Thus, it avoids the conventional practice of employing bentonite and various types of clays in the preparation of bituminous and wax emulsions. These agents produce very stable emulsions. It has also been common practice, particularly in the preparation of rosin and resin emulsions, to add additional alkaline reagents to further facilitate the emulsification. This also is avoided by the present process wherein a primary emulsion is formed with a pH value near the neutral point, and which has sufficient stability to be handled or stored, yet without the use of any clays or alkaline additions. Furthermore, it is necessary to add an acidic agent, usually alum, to precipitate the rosin. In contrast to this, in using the primary emulsion of the present invention, no precipitating agents of any kind are needed. Furthermore, the present invention avoids the use of peptizing agents, such as casein or glue, etc., which are frequently used to facilitate and to stabilize the dispersion. Of course, dispensing with all such additional substances renders my process more economical than any of the conventional processes.

It is also to be observed that while conventional integral waterproofing emulsions very often employ water-repellent agents of low melting point, the process of the present invention necessarily requires a water-repellent agent having a melting point which is high enough to have the agent in the solid or semi-solid phase at the working atmospheric temperature. Thus, U. S. Patent No. 1,913,430 specifies the use of a lubricating oil which would be liquid at the working atmospheric temperature. Likewise, bitumens of low melting point are very commonly employed. Such emulsions do not transform as the primary emulsions of my invention and when broken, precipitate particles which agglomerate into compact masses.

Finally, whereas the conventional emulsifying processes generally employ emulsifying devices of high dispersing power, such as colloid mills, the process of the invention calls for a type of dispersing action which disperses the water-repellent material in comparatively large particles of about 5 to 25 microns and eliminates the use of colloid mills which would produce a particle size well below 1 micron.

Of course, those skilled in the art will readily understand that the process of the invention is much more critical in the control of the various factors than any of the conventional processes. It is generally quite easy to produce conventional highly stabilized emulsions of very small particle size by using high powered dispersing apparatus, such as colloid mills and stabilizing additions. In contrast to this, it will be readily appreciated that the process of the present invention which involves obtaining a critically adjusted degree of stability will be very sensitive to changes in pH, in temperature, and the results will be greatly influenced by the type of dispersing agent, tap water and dispersing action employed. However, all of these variables can be easily determined and a completely satisfactory primary emulsion of proper stability and large particle size, or secondary emulsions stable at all dilutions, can be readily obtained in accordance with the principles explained in the foregoing.

It is also to be noted that the present invention provides primary and secondary emulsions having novel characteristics which will readily appear when examining the emulsions of the invention under the microscope. Thus, the primary paraffin emulsion of the invention shows countless individually suspended mobile particles having sizes varying from about 2 to about 25 microns. The secondary paraffin emulsion embodying the invention shows small groups of associated or aggregated particles. The individual particles usually may be distinguished within the groups.

The primary rosin emulsion of the invention shows individually dispersed particles similar to those of the primary paraffin emulsion but there appears to be a greater variation in the size of the individual particles, the major portion of the particles being of the larger sizes. The secondary rosin emulsion shows groups of associated or aggregated particles with a tendency of forming somewhat larger-sized groups. The groups appear to have more of an agglomerated characteristic.

The primary "Halowax" emulsion shows individually dispersed particles, the average size of which is somewhat smaller than those of the primary paraffin emulsion, and fewer large particles being present. The smaller particles have a greater motional activity. The secondary "Halowax" emulsion shows groups of associated particles, the groups generally being somewhat larger than those found in the secondary paraffin emulsions. In the groups, the individual particles may be readily distinguished.

The present application is a continuation in part of my co-pending application Serial No. 46,742, filed on October 25th, 1935, now Patent No. 2,156,309, for Method of producing compressed products.

I claim:

1. A waterproofing composition comprising an emulsion of a thermoplastic water-repellent substance having in the continuous phase an aqueous body of soluble soap of less than 12½ percent concentration and having in the dispersed phase individual mobile particles of said water-repellent substance having sizes of about 2 to about 25 microns with an average particle size of the majority in the order of 5 microns and in amount such that for every 10 parts by weight of water-repellent substance there is at least 8 parts by weight of combined water and soap; the said emulsion having a creamy character before and after solidification of the dispersed phase and having sufficient stability for handling and storage without aid of stabilizing agents and its water-repellent particles having substantially non-adherent properties, and said emulsion adapted upon dilution with water in the absence of electrolyte to form an emulsion of similar type in which said particles of water-repellent substance are associated into mobile groups having good adherent properties.

2. A waterproofing composition comprising an emulsion of a thermoplastic water-repellent wax having in the continuous phase an aqueous body of soluble soap of less than 12½ percent concentration and having in the dispersed phase individual mobile particles of said wax the average particle size of the majority of which is in the order of 5 microns with a minimum of 3 microns and a maximum of about 10 microns and which are in amount such that for every 10 parts by weight of wax there is at least 8 parts by weight of combined water and soap; the said emulsion having a creamy character before and after solidification of the dispersed phase and having sufficient stability for handling and storage without aid of stabilizing agents and its water-repellent wax particles having substantially non-adherent qualities; and said emulsion being adapted upon substantial dilution with water in the absence of electrolyte to form an emulsion of similar type in which said particles of water-repellent wax are associated into mobile groups having good adherent properties.

3. A waterproofing composition comprising an emulsion of paraffin wax having in the continuous phase an aqueous body of soluble soap of less than 2 percent concentration and having in the dispersed phase individual mobile particles of said paraffin wax the average size of the majority of which is in the order of about 5 microns and in amount such that for every 10 parts by weight of paraffin wax there is at least 8 parts by weight of combined water and soap; the said emulsion having a creamy character and having sufficient stability for handling and storage without aid of stabilizing agents and its particles having substantially non-adherent properties and said emulsion being adapted upon dilution with water in the absence of electrolyte to about 5 per cent concentration to form an emulsion of similar type in which said particles of paraffin wax are associated into mobile groups having good adherent properties.

4. A waterproofing composition comprising an emulsion having a continuous phase comprising water and a soluble soap dispersing agent of less than 2 percent concentration in said water and a dispersed phase comprising mobile particle groups of associated individual particles of a thermoplastic water-repellent substance in a substantially solid state, the said particle groups exhibiting good adherent qualities with respect to contacting materials and the individual particles of said groups having sizes of about 2 to about 25 microns with an average particle size of the majority in the order of 5 microns; said emulsion being sufficiently stable for handling and application without aid of stabilizing agents and being substantially free from tendency to agglomerate into a solid mass at substantially all dilutions with water, and being capable of use to waterproof contacting materials without being deposited by means of an electrolyte.

5. A waterproofing composition comprising an emulsion having a continuous phase consisting of water and a dispersing agent soluble in a solvent comprising water, and a dispersed phase comprising particles of a thermoplastic water-repellent wax in a substantially solid state the average particle size of the majority of which is in the order of about 5 microns, said dispersing agent being present in amount less than 10 percent by weight of the water-repellent wax and said water and dispersing agent combined being present in an amount between 80 percent to about 150 percent by weight of said water-repellent wax; said emulsion having a creamy character and having sufficient stability for handling and storage without aid of stabilizing agents and the water-repellent wax particles thereof having substantially poor adherent properties and said emulsion being adapted upon dilution with water in the absence of electrolyte to form an emulsion in which said particles of water-repellent wax are associated into mobile groups exhibiting good adherent properties.

6. A waterproofing composition comprising an emulsion having in the continuous phase an aqueous body of a water-soluble fatty acid soap of a univalent metal and having in the dispersed phase individual mobile particles of a thermoplastic water-repellent substance having a melting point substantially above 70° F., said water and dispersing agent being present in a quantity of at least about 70 percent and less than about 10 percent by weight respectively of the water-repellent substance and said water-repellent substance being present in particles having an average size between 5 to 25 microns, said emulsion being characterized by its ability to transform upon substantial dilution forming a voluminous flocculent mass consisting of small individual mobile flocks of said particles, substantially free from tendency to agglomerate into a solid mass.

7. A waterproofing composition comprising an emulsion including 1 part paraffin wax, about 1 part water, and about 1/60 part and less of sodium stearate soap; said water and soap forming a continuous phase and said paraffin wax consisting of individual mobile particles thereof the average size of the majority of which is in the order of 5 microns with a minimum of 3 microns and a maximum of about 10 microns, and forming the dispersed phase, and the said paraffin particles exhibiting non-adherent qualities; said emulsion having a creamy character and having sufficient stability for handling and storage without aid of stabilizing agents and said emulsion adapted upon aqueous dilution in the absence of electrolyte to about 5 percent concentration to form an emulsion of similar type in which said individual particles of paraffin wax are associated into mobile groups having good adherent properties.

8. The method of preparing an emulsion of the type having a continuous phase containing a large amount of water and a small amount of dispersing agent, which comprises forming a liquid mixture comprising a large amount of water, a thermoplastic water-repellent substance substantially solid at normal atmospheric temperatures, and a small amount of a water soluble soap dispersing agent, said dispersing agent dissolving in said water to produce a dilute solution and having a concentration in said water of less than 12½% by weight, and said combined water and dispersing agent being present in an amount at least 80% by weight of said water-repellent substance; dispersing said water-repellent substance with high speed mixing in said dilute solution of dispersing agent, and during said mixing reducing said water-repellent substance to particles having sizes of about 2 to about 25 microns with an average particle size of the majority in the order of 5 microns, and forming an emulsion of creamy character having said water and dispersing agent in the continuous phase and said particles of water-repellent substance in the dispersed phase, and having said combined water and dispersing agent present in an amount at least 80% by weight of said water-repellent substance; the said emulsion retaining its creamy character before and after solidification of said thermoplastic water-repellent substance, the particles of water-repellent substance thereof exhibiting substantially non-adherent properties and said emulsion possessing sufficient stability for handling and storage without the aid of stabilizing agents, and being capable of transformation upon dilution with water in the absence of electrolyte into a secondary emulsion having the dispersed phase present as individual groups of associated individual particles which possess water-repellent properties and which grouped particles exhibit a tendency of strongly adhering to surfaces with which they come in contact to waterproof the same.

9. The method of preparing an emulsion of the type having a continuous phase containing a large amount of water and a small amount of dispersing agent, which comprises forming a liquid mixture comprising a large amount of water, a water-repellent wax substantially solid at normal atmospheric temperatures, and a small amount of a water soluble soap dispersing agent, said dispersing agent dissolving in said water to produce a dilute solution and having a concentration in said water of less than 12½% by weight, and said combined water and dispersing agent being present in an amount at least 80% by weight of said water-repellent substance; dispersing said water-repellent substance with high speed mixing in said dilute solution of dispersing agent, and during said mixing reducing said water-repellent substance to particles the average size of the majority of which is in the order of 5 microns with a minimum of 3 microns and a maximum of about 10 microns; and forming an emulsion of creamy character having said water and dispersing agent in the continuous phase and said particles of water-repellent substance in the dispersed phase, and having said combined water and dispersing agent present in an amount at least 80% by weight of said water-repellent substance; the said emulsion retaining its creamy character before and after solidification of said thermoplastic water-repellent substance, the particles of water-repellent substance thereof exhibiting substantially non-adherent properties, and said emulsion possessing sufficient stability for handling and storage without the aid of stabilizing agents, and being capable of transformation upon dilution with water in the absence of electrolyte into a secondary emulsion having the dispersed phase present as individual groups of associated individual particles which possess water-repellent properties and which grouped particles exhibit a tendency of strongly adhering to surfaces with which they come in contact to waterproof the same.

10. The method of preparing an emulsion of the type having a continuous phase containing a large amount of water and a small amount of dispersing agent, which comprises forming a liquid mixture comprising a large amount of water, a paraffin wax, and a small amount of a water soluble soap dispersing agent, said dispersing agent dissolving in said water to produce a dilute solution and having a concentration in said water of less than 2% by weight, and said combined water and dispersing agent being present in an amount at least 80% by weight of said paraffin wax; dispersing said paraffin wax with high speed mixing in said dilute solution of dispersing agent, and during said mixing reducing said paraffin wax to particles the average size of the majority of which is in the order of about 5 microns, and forming an emulsion of creamy character having said water and dispersing agent in the continuous phase and said particles of paraffin wax in the dispersed phase, and having said combined water and dispersing agent present in an amount at least 80% by weight of said paraffin wax; the said emulsion retaining its creamy character before and after solidification of said paraffin wax, the particles of said dispersed phase thereof exhibiting substantially non-adherent properties, and said emulsion possessing sufficient stability for handling and storage without the aid of stabilizing agents, and being capable of transformation upon dilution with water to about 5% paraffin content, in the absence of electrolyte, into a secondary emulsion having the dispersed phase present as individual groups of associated individual particles which possess water-repellent properties and which grouped particles exhibit a tendency of strongly adhering to surfaces with which they come in contact to waterproof the same.

11. The method of preparing an emulsion of the type having a continuous phase containing a large amount of water and a small amount of dispersing agent, which comprises forming a liquid mixture comprising a large amount of water, a thermoplastic water-repellent substance substantially solid at normal atmospheric temperatures, and a small amount of a water soluble soap dispersing agent, said dispersing agent dissolving in said water to produce a dilute solution and having a concentration in said water of less than 12½% by weight, and said combined water and dispersing agent being present in an amount at least 80% by weight of said water-repellent substance; dispersing said water-repellent substance with high speed mixing in said dilute solution of dispersing agent, and during said mixing reducing said water-repellent substance to small particles having an average size between 5 to about 25 microns, and forming an emulsion of creamy character having said water and dispersing agent in the continuous phase and said particles of water-repellent substance in the dispersed phase, and having said combined water and dispersing agent present in an amount at least 80% by weight of said water-repellent substance; the said emulsion retaining its creamy character before and after solidification of said thermoplastic water-repellent substance, the particles of water-repellent substance thereof exhibiting substantially non-adherent properties, and said emulsion possessing sufficient stability for handling and storage without the aid of stabilizing agents; and subsequently diluting the aforesaid emulsion with water in the absence of electrolyte to form a secondary emulsion having the dispersed phase present as individual groups of associated individual particles which possess water-repellent properties and which grouped particles exhibit a tendency of strongly adhering to surfaces with which they come in contact to waterproof the same.

12. The method of preparing an emulsion of the type having a continuous phase containing a large amount of water and a small amount of dispersing agent, which comprises forming a hot liquid mixture comprising a large amount of water, a melted thermoplastic water-repellent substance substantially solid at normal atmospheric temperatures, and a small amount of a water soluble soap dispersing agent, said dispersing agent dissolving in said water to produce a dilute solution and having a concentration in said water of less than 12½% by weight, and said combined water and dispersing agent being present in an amount of about 80% to 150% by weight of said water-repellent substance; dispersing said water-repellent substance with high speed mixing in said dilute solution of dispersing agent, and during said mixing reducing said water-repellant substance by an action characterized by a narrow flat propeller blade set almost straight and operated at about 3500 R. P. M. to particles having an average size between about 5 to 25 microns, and forming an emulsion of uniform creamy character having said water and dispersing agent in the continuous phase and said particles of water-repellant substance in the dispersed phase, and having said combined water and dispersing agent present in an amount at least 80% by weight of said water-repellent substance; the said emulsion retaining its creamy character before and after solidification of said thermoplastic water-repellant substance, the particles of water-repellant substance thereof exhibiting substantially non-adherent properties, and said emulsion possessing sufficient stability for handling and storage without the aid of stabilizing agents, and being capable of transformation upon dilution with water in the absence of electrolyte into a secondary emulsion having the dispersed phase present as individual groups of associated individual particles which possess water-repellant properties and which grouped particles exhibit a tendency of strongly adhering to surfaces with which they come in contact to waterproof the same.

13. The method of preparing an emulsion of the type having a continuous phase containing a large amount of water and a small amount of dispersing agent, which comprises forming a liquid mixture comprising a large amount of water, a thermoplastic water-repellant substance substantially solid at normal atmospheric temperatures, and a small amount of a water soluble soap dispersing agent, said dispersing agent dissolving in said water to produce a dilute solution and having a concentration in said water of less than 12½ by weight, and said combined water and dispersing agent being present in an amount at least 80% by weight of said water-repellant substance, and emulsifying the aforesaid liquid mixture with high speed mixing and with shearing of said water-repellant substance to particles of a size intermediary between colloidal size and large emulsoidal size and ranging in majority between about 5 to about 25 microns, and forming an emulsion having a creamy character and having said water and dispersing agent in the continuous phase and said particles of water-repellant substance in the dispersed phase; said emulsion possessing sufficient stability for handling and storage without aid of stabilizing agents, and being capable of transformation upon dilution with water in the absence of electrolyte into a secondary emulsion having the dispersed phase present as individual groups of associated individual particles which possess water-repellant properties and which grouped particles exhibit a tendency of strongly adhering to surfaces with which they come in contact to waterproof the same.

14. The method of preparing an emulsion of the type having a continuous phase containing a large amount of water and a small amount of dispersing agent, which comprises dissolving a small amount of a water soluble soap dispersing agent in a large amount of water to form a dilute aqueous soap solution having a concentration of said dispersing agent in said water of less than 12½% by weight, introducing into said dilute aqueous soap solution molten liquid thermoplastic water-repellent substance while said solution is in a heated condition, said combined water and dispersing agent being present in an amount at least 80% by weight of said water-repellent substance, subjecting said dilute aqueous soap solution containing said water-repellent substance to high speed mixing to disperse said water-repellent substance in said solution and to a mixing sufficiently vigorous to shear said water-repellent substance into individual mobile particles the majority of which are under 25 microns in size, but insufficient to convert said particles to a majority of a size less than about 5 microns, cooling the mass to form an emulsion of the character of creamy foam having said water and dispersing agent in the continuous phase and said particles of water-repellent substance in the dispersed phase, and having said combined water and dispersing agent present in an amount at least 80% by weight of said water-repellent substance; and stirring the emulsion to form a uniform cream; the said emulsion retaining its creamy character before and after solidification of said thermoplastic water-repellent substance, the particles of water-repellent substance thereof exhibiting substantially non-adherent properties, and said emulsion possessing sufficient stability for handling and storage without the aid of stabilizing agents, and being capable of transformation upon dilution with water in the absence of electrolyte into a secondary emulsion having the dispersed phase present as individual groups of associated individual particles which possess water-repellent properties and which grouped particles exhibit a tendency of strongly adhering to surfaces with which they come in contact to waterproof the same.

15. The method of preparing an emulsion of the type having a continuous phase containing a large amount of water and a small amount of dispersing agent, which comprises forming a hot dilute aqueous solution containing a large amount of water and a small amount of a water soluble soap dispersing agent, said dispersing agent having a concentration in said water of less than 12½% by weight, introducing molten liquid water-repellent wax into said hot dilute aqueous solution, said combined water and dispersing agent being present in said solution in an amount at least 80% by weight of said water-repellent wax and subjecting said dilute aqueous soap solution containing said molten liquid wax to high speed agitation to disperse said wax in said soap solution and to a shearing action sufficient to reduce the majority of the particles of said wax to a size less than about 10 microns but insufficient to reduce the majority of said particles to a size less than about 3 microns, whereby complete emulsification is obtained without obtaining a large mass of comparatively large particles and lumps, and whereby an emulsion is produced of creamy character having said water and dispersing agent in the continuous phase and said particles of water-repellent substance in dispersed phase, and having said combined water and dispersing agent present in an amount at least 80% by weight of said water-repellent substance and possessing sufficient stability for handling and storage without the aid of stabilizing agents; and subsequently diluting said emulsion with water in the absence of electrolyte to produce a secondary emulsion having the dispersed phase present as individual groups of associated individual particles which possess water-repellent properties and which grouped particles exhibit a tendency of strongly adhering to surfaces with which they come in contact to waterproof the same.

16. The method of preparing an emulsion of the type having a continuous phase containing a large amount of water and a small amount of dispersing agent, which comprises forming a liquid mixture comprising a large amount of water, a thermoplastic water-repellent substance substantially solid at normal atmospheric temperatures, and a small amount of water soluble soap dispersing agent, said dispersing agent dissolving in said water to produce a dilute solution and having a concentration in said water of less than 12½% by weight, and said combined water and dispersing agent being present in an amount at least 80% by weight of said water-repellent substance; dispersing said water-repellent substance in said dilute solution of dispersing agent by a high speed agitation sufficiently vigorous to reduce said water-repellent substance to small particles having an average size between about 5 to about 25 microns, thereby forming an emulsion of creamy character having said water and dispersing agent in the continuous phase and said particles of water-repellent substance in the dispersed phase, and having said combined water and dispersing agent present in an amount at least 80% by weight of said water-repellent substance; the said emulsion retaining its creamy character before and after solidification of said thermoplastic water-repellent substance, the particles of water-repellent substance thereof exhibiting substantially non-inherent properties and said emulsion possessing sufficient stability for handling and storage without the aid of stabilizing agents, and being capable of transformation upon dilution with water in the absence of electrolyte into a secondary emulsion having the dispersed phase present as individual groups of associated individual particles which possess water-repellent properties and which grouped particles exhibit a tendency of strongly adhering to surfaces with which they come in contact to waterproof the same.

CHARLES H. SCHUH.